United States Patent Office 3,562,206
Patented Feb. 9, 1971

---

3,562,206
PROCESS FOR PRODUCING ULTRAHIGH MOLECULAR WEIGHT POLYAMIDES
Bernard Silverman, Raleigh, N.C., and Leslie E. Stewart, Pensacola, Fla., assignors to Monsanto Company, St. Louis, Mo., a corporation of Delaware
No Drawing. Filed Dec. 15, 1967, Ser. No. 690,781
Int. Cl. C08f *45/56;* C08g *20/20*
U.S. Cl. 260—45.7           3 Claims

ABSTRACT OF THE DISCLOSURE

Linear polyamides having an [$\eta$] above 3.5 and a viscosity average molecular weight above 100,000 are provided. These polyamides are especially useful as molding resins. They are produced by a method of solid state polymerization, i.e., heating lower molecular weight polymer having an amine to carboxyl end ratio of at least 1.1 at a temperature of between 130° C. and 200° C., in the absence of oxygen.

BACKGROUND OF THE INVENTION

Field of the invention

This invention relates to polyamides, i.e., polymers containing recurring carbonamide linkages in the polymer chain. More specifically, this invention relates to linear polyamides having ultrahigh molecular weights and to the process for increasing the molecular weight of polyamides. These ultrahigh molecular weight polyamides are particularly useful as molding powders.

Description of the prior art

For some time now, high molecular weight polyamide molding powders have been produced by a process termed "solid state polymerization." These products have met with wide commercial acceptance since the increase in molecular weight is accompanied by an increase in strength. Generally, the process by which these high molecular weight products are produced comprised heating a polyamide to temperatures of between about 200° C. and 240° C., but below the melting point of the polyamide. It has also been rather generally accepted that the different end groups in the polyamide, i.e., amine and carboxyl ends, should be very close to equal since it was thought that during the solid state polymerization process the carboxyl and amine ends of the polymers present must react with each other, thus, increasing the average molecular weight of the polymers, and that an excess of one of the ends would result in cross-linking, which is recognized as undesirable.

The processes heretofore employed are characterized by a rather rigid limitation, namely, temperature. For example, it has been thought that the higher the temperature employed in the process, the greater the molecular weight of the final product. However, the temperature could not be raised to the point where polymer degradation would occur since, obviously, this would result in a poorer product. As a result of these process limits the linear polyamide molding powders have generally been limited in their viscosity average molecular weights to below 80,000, in their intrinsic viscosity, [$\eta$], to below about 3.0 and in their relative viscosity, RV, to 350 and below. It would of course be desirable to produce linear polyamides having higher values.

SUMMARY OF THE INVENTION

In accordance with this invention there is provided a linear polyamide having [$\eta$] above 3.2 and a viscosity average molecular weight above 100,000. Preferably, the polyamides of this invention have an [$\eta$] greater than 3.8 and a viscosity average molecular weight above 120,000. These polyamides find special utility as molding resins due to their high strength.

Surprisingly, it has been found that these polyamides having ultrahigh molecular weights can be produced by solid state polymerization at temperatures of between about 130° C. and 200° C. when the end groups of the starting polymer are out of balance in favor of the amine ends. It is necessary, therefore, that the ratio of amine ends to carboxyl ends in the starting polymer be greater than 1.1, preferably between 1.2 and 2.0. That such a process would result in ultrahigh molecular weight linear polyamides is unexpected since, as stated above, it was generally though that such an end group unbalance would result in cross-linking. However, the ultrahigh molecular weight polyamides of this invention are linear as evidenced by their solubility in formic acid at 25° C.

The process of solid state polymerization employed in accordance with this invention must be carried out in the absence of oxygen and moisture. This is readily accomplished by heating the polyamides while under a cover of a dry, inert gas or under a vacuum. It has also been found that small quantities of phosphorus when added to the starting polyamide serve a beneficial effect on the process and resulting product. The phosphorus is normally added as a compound, e.g., phosphorus acid, phosphoric acid, phosphinic acids such as phenyl phosphinic acid, phosphites, such as manganous hypophosphite, and the like. Generally, the phosphorus is present in an amount of between 200 and 500 p.p.m., based in the polyamide.

As starting material in the process of this invention there is employed polyamides formed by reaction of a dicarboxylic acid of the formula HOOC—R—COOH and a diamine of the formula $H_2N$—R—$NH_2$, or by the interpolymerization of an amino acid of the formula

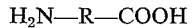

wherein R is a divalent hydrocarbon radical. The typical suitable dicarboxylic acids represented by

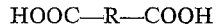

are oxalic, adipic, suberic, pimelic, azelaic, sebacic, brassylic, octadecanoic, undecanoic, glutaric, tetradecanoic, p-phenylene diacetic, isophthalic, terephthalic, hexahydroterephthalic, and the like, and mixtures thereof. Typical suitable diamines represented by $H_2N$—R—$NH_2$ are ethylene diamine, propylene diamine, tetramethylene diamine, pentamethylene diamine, hexamethylene diamine, octamethylenediamine, decamethylene diamine, p-xylylenediamine, p-phenylenediamine, bis(4-aminocyclohexyl) methane, piperazine, and the like, and mixtures thereof. Typical suitable amino acids of the formula

are 6-aminocaproic acid, 9-aminononanoic acid, 11-aminoundecanoic acid, 17-amino-heptadecanoic acid, and the like.

These polyamide starting materials are well known in the art. They are known to have an intrinsic viscosity, [$\eta$], of between about 0.5 and about 2 and a viscosity average molecular weight between about 20,000 and about 60,000. As stated above, the process of this invention involves heating these polyamides at a temperature of between about 130° C. and 200° C. and below their melting point, in the absence of oxygen and moisture for a period of time sufficient to raise their [$\eta$] and $\overline{M}v$ (viscosity average molecular weight) to the desired levels. The polyamide starting materials must also exhibit an unbalanced end group ratio in favor of the amine ends, as defined above.

As used herein the term intrinsic viscosity, $[\eta]$, is defined as:

$$\lim_{C \to} \left( \frac{\log_e N_r}{C} \right)$$

where $N_r$ is the relative viscosity of a dilute solution of the polymer in formic acid at 25° C. in the same units and C is the concentration in grams of polymer per 100 cc. of solution. And the term "viscosity average molecular weight" is defined as $$\overline{M}_v = 24{,}650[\eta]^{1.272}$$

DESCRIPTION OF PREFERRED EMBODIMENTS

In order to further illustrate the invention the following examples are given. It is to be understood that they are merely illustrative and not limiting.

EXAMPLE I

Polyhexamethylene adipamide resin, having a $[\eta]$ of 1.32, a $\overline{M}v$ of 35,000, a ratio of amine ends to carboxyl ends of 1.26:1 and containing 268 p.p.m. phosphorus in the form of phenyl phosphinic acid and manganous hypophosphite, was heated at 174° C. for 24 hours at 8 mm. of Hg. Upon completion of the heating the resultant polyamide had a $[\eta]$ of 4.7 and a $\overline{M}v$ of 176,000.

EXAMPLE II

Polyhexamethylene adipamide resin having a $[\eta]$ of 1.36, a $\overline{M}v$ of 36,500, a ratio of amine ends to carboxyl ends of 1.81:1 and containing 400 p.p.m. of phosphorus was treated under the conditions described in Example I. The resulting polyamide had a $[\eta]$ of 3.9 and a $\overline{M}v$ of 139,000.

We claim:

1. A process for producing linear polyhexamethylene adipamide having an intrinsic viscosity above 3.5 and a viscosity average molecular weight above 100,000 which comprises heating preformed polyhexamethylene adipamide having an intrinsic viscosity of between about 0.5 and about 2, a viscosity average molecular weight between about 20,000 and about 60,000 and a ratio of amine end groups to carboxyl end groups greater than 1.1 in the solid state at a temperature of between 130° C. and 200° C. in the absence of oxygen and moisture for a time sufficient to allow solid state polymerization of said preformed polyhexamethylene adipamide.

2. The process of claim 1 wherein the ratio of amine ends to carboxyl ends is between 1.2:1 and 2.0:1.

3. The process of claim 1 wherein between 200 and 500 p.p.m. of phosphorus is added to the starting polyamide.

References Cited

UNITED STATES PATENTS

| | | | |
|---|---|---|---|
| 2,172,374 | 9/1939 | Flory | 260—78 |
| 2,558,031 | 6/1951 | Allen et al. | 260—78 |
| 3,078,248 | 2/1963 | Ben | 260—78 |
| 3,420,804 | 1/1969 | Ramsey et al. | 260—78 |

FOREIGN PATENTS

| | | | |
|---|---|---|---|
| 798,659 | 7/1958 | Great Britain | 260—78SC |
| 802,970 | 10/1958 | Great Britain | 260—78SC |
| 806,088 | 12/1958 | Great Britain | 260—78SC |

OTHER REFERENCES

Chem. Abstract; vol. 66; 3707v, Nylons of High Relative Viscosity, Monsanto Co.

WILLIAM SHORT, Primary Examiner

E. WOODBERRY, Assistant Examiner

U.S. Cl. X.R.

260—78